May 16, 1933.  L. DE FLOREZ  1,909,815
REMOTE CONTROL
Filed Jan. 30, 1930   5 Sheets-Sheet 1

INVENTOR
Luis de Florez
BY
Hoguet & Neary
ATTORNEY

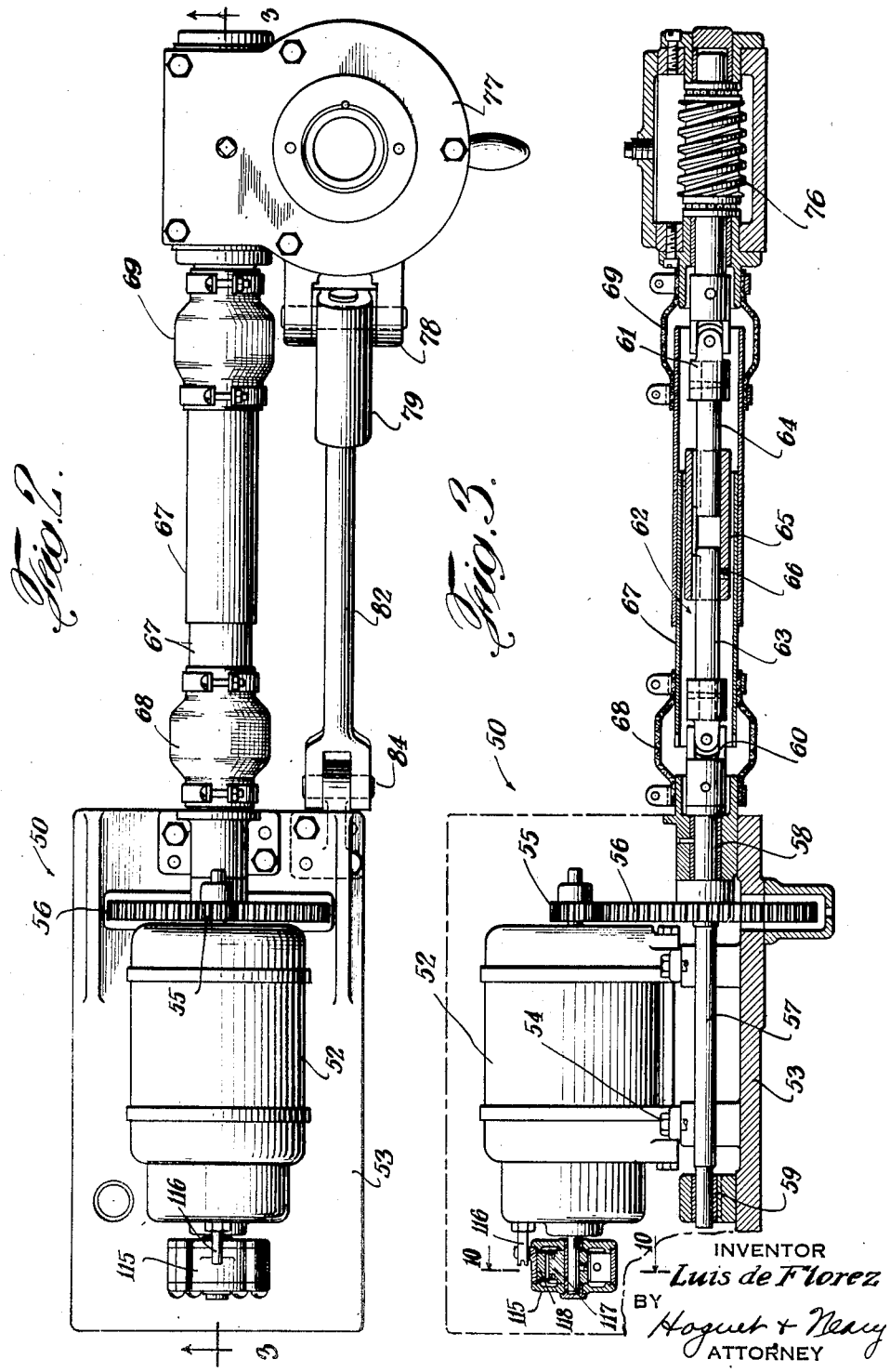

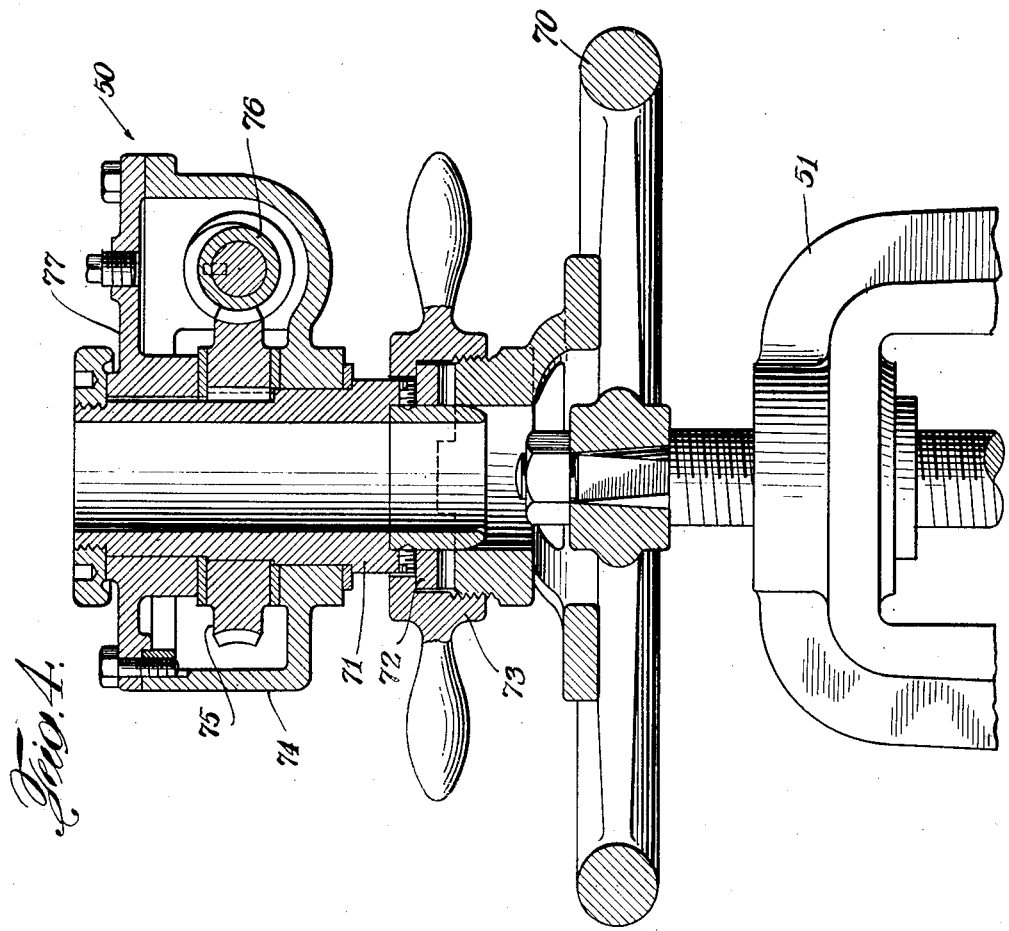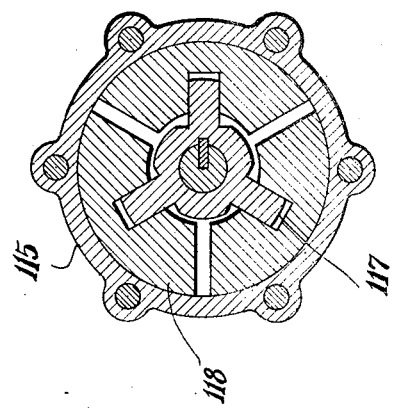

May 16, 1933.                L. DE FLOREZ                1,909,815
REMOTE CONTROL
Filed Jan. 30, 1930            5 Sheets-Sheet 4
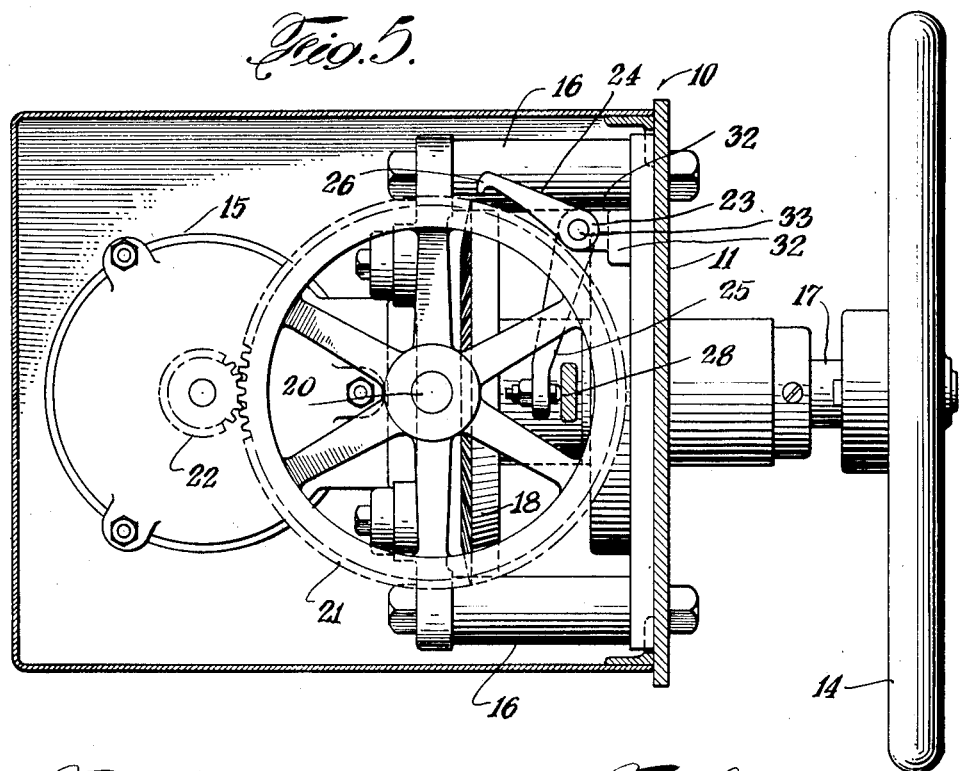
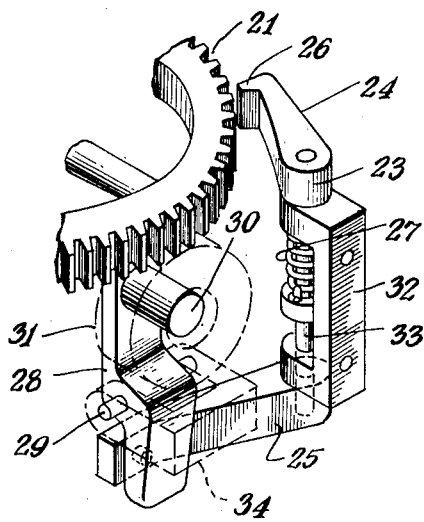
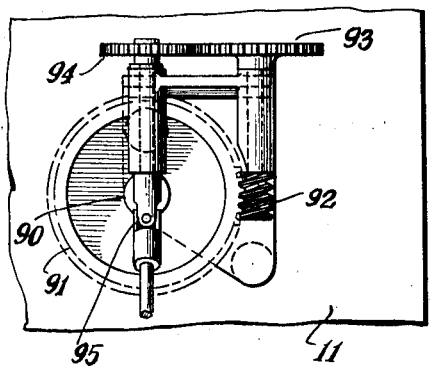
INVENTOR
*Luis de Florez*
BY
*Hoguet & Neary*
ATTORNEY

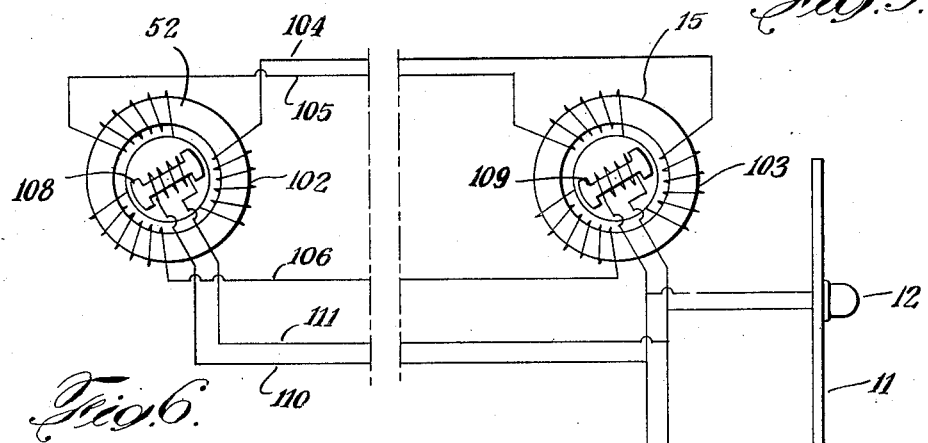
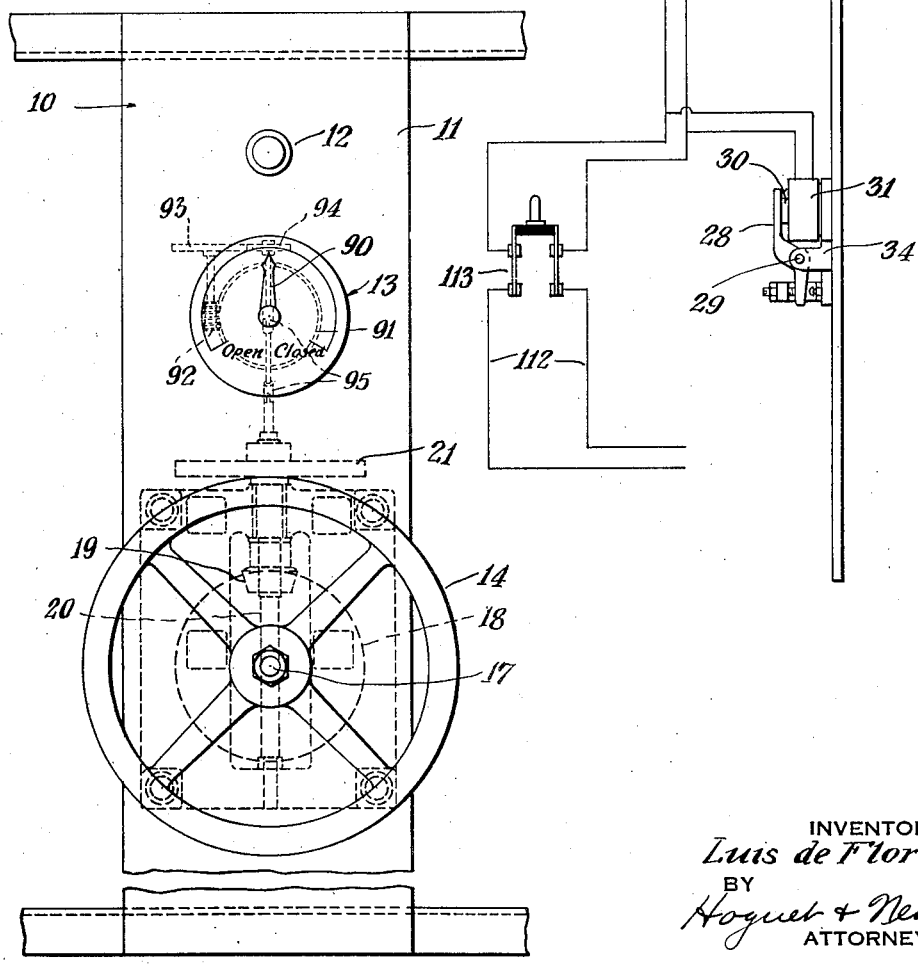

Patented May 16, 1933

1,909,815

UNITED STATES PATENT OFFICE

LUIS DE FLOREZ, OF POMFRET, CONNECTICUT

REMOTE CONTROL

Application filed January 30, 1930. Serial No. 424,510.

This invention relates to remote control systems and more particularly to one in which an element at a remote point is electrically adjusted from a central station.

An object of the invention is to adjust a valve or other control element from a remote point and to indicate the amount of adjustment to the operator.

It is also an object of the invention to prevent the transmitting and indicating apparatus from getting out of phase with the receiving apparatus when the source of power energizing the two is disconnected.

Still another object of my invention is to reduce asynchronism between the control element and the element controlled due to resistance encountered from the latter.

In carrying out my invention I provide a pair of alternating current self-synchronizing motors of a special type known in the trade as Selsyn motors, one of which is connected to the element to be controlled while the other is located at the transmitting station. Means are provided at the transmitting station for manually turning the rotor of the motor situated thereat through a system of gearing, and a locking means is provided which engages the gears and prevents them from functioning when the power supply to the Selsyn motors is disconnected.

At the receiver the Selsyn motor is geared to the element to be adjusted, hereafter called the remotely controlled element, by means of a worm and wheel, and as the adjusting means may have a considerable range of travel a flexible extension arm is provided to connect the motor to the worm and wheel gearing, in order to accommodate this range of movement. The worm and wheel are encased in a housing which is prevented from turning as adjustments are made by a rigid arm connected to it and the motor frame.

A further object of gearing of the transmitting and receiving element is to prevent the Selsyn motors from getting out of phase when resistance is encountered at the receiving end. The Selsyn motors are essentially synchronized mechanisms so that when one rotor is turned the other turns a corresponding amount. The motors however, are not capable of transmitting a very large torque and in order to transmit the required power the motor at the transmitting end is geared up so that it turns faster than the hand wheel and the motor at the receiving end is geared down so that the receiving motor turns faster than the element which is to be moved. This permits the power to be transmitted at low torque and high speed and to be converted to high torque at low speed at the point where the power is applied. Decreasing the torque on the motors lessens their tendency to be out of phase and the gearing described has the additional advantageous result of cutting down the amount that the transmitting and receiving elements are out of phase as compared to the phase displacement of the transmitting and receiving motors by the ratio of the gearing.

An indicating mechanism is located at the transmitter which indicates the amount of adjustment imparted to the remotely controlled element. This indicator is suitably geared to the manually operated mechanism which operates the transmitting motor and the gearing is such that the range of travel of the indicator corresponds to the range of adjustment which may be imparted to the remotely controlled element.

A better understanding of the invention may be had from the following description, together with the accompanying drawings, in which:

Fig. 2 is a plan view of the receiver showing the receiving motor and its connection with the remotely controlled element.

Fig. 3 is a longitudinal sectional view on line 3—3 of Figure 2 showing the details of the extension arm.

Fig. 4 is a transverse sectional view on line 4—4 of Fig. 1 showing the worm and wheel mechanism by means of which the adjustment is imparted to the remotely controlled element.

Fig. 5 is a plan view of the transmitting element showing the mounting of the transmitting motor.

Fig. 6 is a front elevation of the transmitting element.

Fig. 7 is a detail view of the locking mechanism.

Fig. 8 is a rear view of the gear mechanism for operating the indicator.

Fig. 9 is a diagrammatical wiring diagram of the transmitting and receiving motors, showing the manner in which the locking mechanism and the indicating lamp are connected.

Fig. 10 is a section on line 10—10 of Fig. 3, showing details of the brake mechanism.

Figure 1:
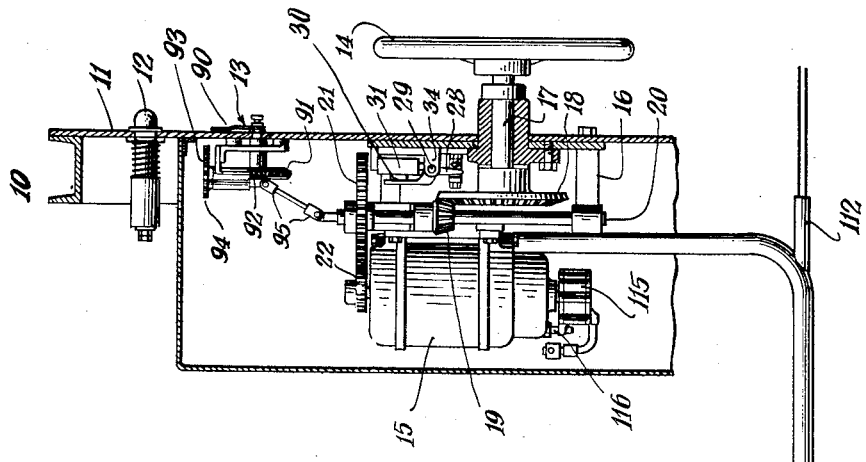
Fig. 1 is an elevation, partly in section, of the transmitter and receiver assembly.
Figure 1:
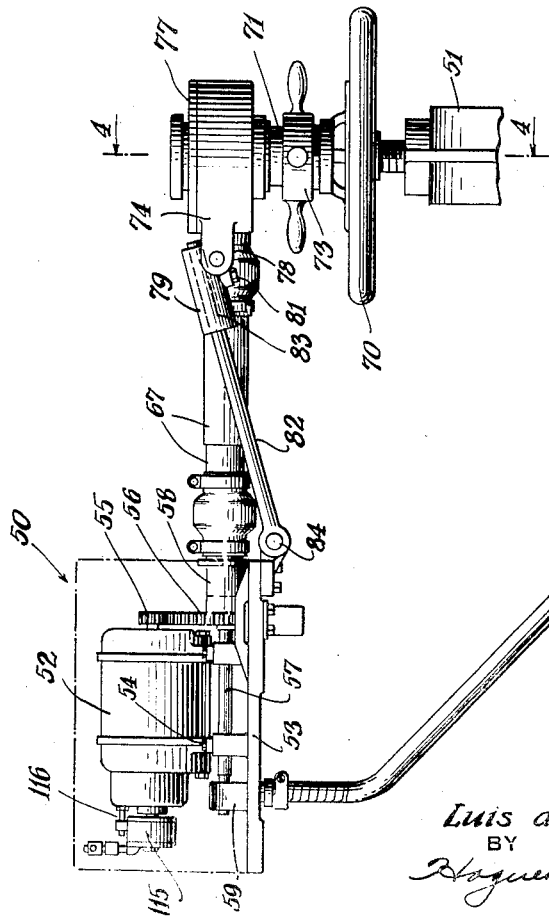

Referring now to the drawings, a transmitter 10 is shown, connected to a receiver 50 located at a remote point adjacent an element to be controlled, which in this instance is shown as a valve 51.

The transmitting element 10 comprises a panel 11 upon which is mounted an indicating lamp 12, an indicator 13, and a hand wheel 14 mechanically connected to the motor 15 which is preferably of the Selsyn type heretofore referred to. This motor is mounted on the panel 11 by suitable means, as for instance studs 16.

The hand wheel 14 is connected to one end of a shaft 17 while at the other end is positioned a beveled gear 18 meshing with a beveled pinion 19 fixedly mounted on the shaft 20. Keyed to the shaft 20 in suitable manner is a gear 21 which in turn meshes with a pinion gear 22 keyed to the rotor shaft of the motor 15.

Associated with the gear 21 is a locking mechanism which prevents inadvertent turning of the hand wheel 14 when the power is disconnected so that the rotor of the motor 15 cannot be displaced without a corresponding displacement of the rotor of the receiving motor. The locking mechanism (Fig. 7) comprises an element 23 in the nature of a bell crank, although its arms 24 and 25 are in parallel planes, fastened together by the shaft 33 journaled in the bracket 32 which is positioned on the panel 11.

On the free end of the arm 24 is a dog 26 which is adapted to enter between the teeth of the gear 21. This dog is normally held out of engagement, against the tension of the spiral spring 27, by means of the lever 28 pivoted at 29 in the bracket 34. Integral with the other end of the lever 28 is the armature 30 of a solenoid 31 (shown in dot and dash line in Fig. 7) which is energized from the same power source that supplies power to the motors of the transmitter and the receiver (Fig. 9).

Just above the hand wheel 14 in full view is the indicator 13 by means of which the operator is apprised of the condition of the remotely controlled element.

The indicator 13 has an indicating arm 90 keyed to a shaft which carries a worm wheel 91 (Fig. 8). Meshing with the worm wheel is the worm 92 integral with the gear 93 which meshes with the pinion 94. The pinion 94 is connected through a pair of universal joints 95 to the shaft of the gear 21 so that any adjustment of the wheel 14 will be imparted to the indicator arm 90. The relation of the gears 91, 92, 93 and 94 is such that the full travel of the pointer 90 will correspond to the full range of the valve 51. It is thus seen that the indicator 13 at all times indicates the exact condition of the valve 51 to the operator located at the remotely situated control.

At the receiving end a motor 52, in all respects similar to motor 15 at the transmitter, is shown fixedly mounted upon a base 53 and held in position by machine screws 54. Keyed to the rotor shaft of this motor is the pinion 55 meshing with a gear 56 which in turn is keyed to the shaft 57 mounted in bearings 58 and 59. The rotation of this shaft is transmitted to the element to be controlled through an extension arm 62 comprising two sections 63 and 64, one of which is connected to the shaft 57 by the universal joint 60 while the other is connected through the universal joint 61 to the worm 76. The two sections of the extension arm may move longitudinally with respect to each other although relative rotation is prevented by the sleeve 65 which is keyed to one section and splined to the other. The sleeve is held stationary with respect to one of the sections by means of the set screw 66, while the other section is free to slide with respect to the sleeve. The universal joint and the extension arm are encased in a protective sheaf 67 comprising two sections of tubing one slidably fitting within the other, and the flexible connecting sheaves 68 and 69.

In the embodiment shown the element to be controlled comprises a standard valve which is opened and closed by operating the hand wheel 70. In addition to rotation the wheel 70 also has a vertical movement equal to the full movement of the valve between its closed and extreme open positions. A hollow shaft 71 having a collar 72 at its lower end is attached to the hand wheel by means of a hand nut 73. About the upper portion of the shaft is a housing 74 in which is mounted a worm wheel 75 keyed to the shaft 71. Meshing with the worm wheel is the worm 76, which as heretofore described, is connected to the receiving motor. The worm wheel housing 74 has a removable cover plate 77 which also facilitates assembly of the worm and wheel and the other parts connected to the hand wheel 70. Integral with the worm wheel housing on the side adjacent the receiving motor are the lugs 78 in which is hinged a sleeve 79. One end of a rod 82 is hinged to the motor base plate at 84 while the other end is adapted to slide in the sleeve 79. The portion of the rod 82 which slides in the sleeve is equipped with a key-way 83 to accommodate a screw 81 which prevents relative rotation between the sleeve and the rod. The reason for the extension connection between the motor and the worm is apparent, since due to the vertical travel of the valve hand wheel heretofore mentioned, the worm wheel connection and its housing will also have a movement with respect to the motor for which reason an elongating connection which will accommodate this movement is necessary. Any tendency that the flexible connection has to permit rotation of the housing 74 as the hand wheel turns, is prevented by the rigid rod 82.

As pointed out heretofore in order to transmit sufficient power by the Selsyn motors to operate the valve at the receiving end it is necessary to gear up the Selsyn motor at the transmitter and gear it down at the receiver thus transmitting the power at high speed and low torque as the Selsyn motors tend to work out of phase if large torques are attempted to be transmitted. Thus if it requires a torque of 100 ft. lbs. to turn the valve at the receiver and the most efficient torque transmitted by the Selsyn motors is 1 ft. lb. the transmitter is geared up 100 to 1 so that by applying 100 ft. lbs. to the hand wheel a torque of 1 ft. lb. is applied to the motor and the motor is rotated one hundred times as fast as the hand wheel. Correspondingly at the receiving end the motor is geared down to the valve at a ratio of 100 to 1 so that a torque of 1 ft. lb., applied to the receiving motor will apply a torque of 100 ft. lbs., to the valve. Under these circumstances, the hand wheel would turn the same amount as the valve and whatever pressure is put on the hand wheel is transmitted to the valve, less friction. The torque necessary to turn very large valves in some cases may be greater than that which can be readily applied to the hand wheel in which case by making the gear ratio at the transmitter less than that at the receiver, a mechanical advantage is obtained which materially aids in operating the valve. Thus if the ratio at the transmitter is geared up 25 to 1 and the receiver geared down at a ratio of 100 to 1, the hand wheel makes four turns to one turn of the valve and it is only necessary to apply one quarter of the torque to the hand wheel that is necessary to turn the valve. By properly regulating the gearing between the hand wheel 14 and the indicator 13 the full travel of the latter may still be made to correspond to the full travel of the valve.

The wiring diagram of the Selsyn motors 15 and 52, the indicator lamp 12 and the solenoid 31 of the locking device and their connection with the power line 112 is shown in Fig. 8. As described above, motor 52 is connected to the valve which it is desired to operate, and motor 15 is the transmitting motor. The field windings 102 and 103 of the motors 52 and 15 respectively are substantially similar to the field windings of an ordinary three-phase induction motor and are connected together as shown in the diagram by leads 104, 105 and 106. The rotors 108 and 109 of the motors 52 and 15 respectively are shuttle wound and have definite poles and the rotor windings are connected together by slip rings (not illustrated) by means of the leads 110 and 111. The leads 110 and 111 are energized from an ordinary sixty cycle single phase alternating current power line 112. Each motor of the pair is similar in construction. When a turning force is exerted on a shaft of one of the motors the change in the magnetic field of the motor will affect the other motor of the pair and cause its rotor to move the same distance as the rotor of the first motor has been moved. The distance between the two motors, of course, does not in the least affect the action above described. The construction, mode of connection and manner of operation of such motors are well understood by electrical engineers and need not be herein described more fully. It will be apparent that by the use of such a pair of motors the desired mechanism may be controlled from a distant point while at the same time obtaining an accurate indication of the operating position of the mechanism being controlled.

The source of power is also connected to a solenoid 31 and the indicating lamp 12. As is customary a switch 113 is provided for disconnecting the power when necessary. It will be evident that under ordinary circumstances the opening of the switch 113 will not prevent the hand wheel 14 from being turned, so that should this occur inadvertently the rotor of the motor 15 would be thrown out of phase with that of the motor 52 while the indicator 13 would cease to have any fixed relation whatsoever with the position of the hand wheel of the valve 51. Such a situation, however, is prevented by means of my locking device heretofore described. From the wiring diagram it will be seen that upon opening the switch 113 the indicating lamp 12 is extinguished and the solenoid 31 de-energized. As there is no longer any force resisting the tension of the spring 27 (Fig. 7) the dog 26 on the end of the arm 24 will immediately engage the gear wheel 21 and prevent it from turning.

It is quite essential that neither of the motors overrun the desired adjustment, and to this end I have provided a novel brake mechanism best shown in Fig. 3 and Fig. 10. This mechanism comprises a small brake housing 115 mounted on the rotor shaft of each of the motors 15 and 52. The brake housing is prevented from turning by a screw 116 which fastens it to the motor housing. Upon the rotor shaft within the housing 15 is keyed a spider 117 having a plurality of arms upon which are slidably mounted shoes 118 which, due to centrifugal force tend to be thrown in contact with the brake housing. The friction of this contact is sufficient to provide a braking action to prevent the rotors from over-running the desired adjustment.

Although I have described this invention in connection with a particular type of transmitter and receiver elements, nevertheless, it is capable of broad interpretation, and many modifications thereof will suggest themselves to those skilled in the art. I desire to be limited, therefore, only by the prior art and the scope of the appended claims.

I claim:

1. In a system for manually controlling a device from a remote point, in combination, a transmitter and a receiver each having field windings and rotor windings electrically connected together for synchronous operation, and actuating mechanism for said device comprising a support, a drive shaft rotatably mounted on said support, gearing connecting said receiver and said drive shaft, a housing, a second shaft rotatably mounted in said housing, an extensible intermediate shaft flexibly connecting said drive shaft and said second shaft, a driven shaft rotatably mounted in said housing, gearing connecting said second shaft and said driven shaft, means for connecting said driven shaft to the device to be actuated, and a torque member pivotally connecting said support and said housing and adapted to prevent rotation of said housing.

2. In a system for manually controlling a device from a remote point, in combination, a transmitter and a receiver each having field windings and rotor windings electrically connected together for synchronous operation, and actuating mechanism for said device comprising a support, a drive shaft rotatably mounted on said support, gearing connecting said receiver and said drive shaft, a housing, a second shaft rotatably mounted in said housing, an extensible intermediate shaft flexibly connecting said drive shaft and said second shaft, a worm secured to said second shaft, a worm wheel meshing with said worm, said worm and wheel being located in said housing, a hollow driven shaft secured to said worm and rotatably mounted in said housing, means for connecting said hollow driven shaft to the device to be actuated, and a torque member pivotally connecting said support and said housing and adapted to prevent rotation of said housing.

3. In a system for manually controlling a device from a remote point, in combination, a transmitter and receiver each having field windings and rotor windings electrically connected together for synchronous operation, said transmitter and receiver each comprising a housing containing said field windings and a shaft rotatably mounted in said housing and upon which said rotor windings are mounted, and means for preventing said transmitter and receiver from overrunning the desired adjustment and getting out of phase, said means comprising separate brake housings secured to each of said transmitter and receiver housings, spiders secured to the rotor shaft of said transmitter and receiver, and a plurality of brake shoes slidably mounted upon each of said spiders and adapted to be thrown into contact with the associated brake housing by centrifugal force upon rotation of said rotor shafts.

In testimony whereof, I have signed my name to this specification this 27th day of January, 1930.

LUIS DE FLOREZ.